United States Patent [19]
Ino

[11] Patent Number: 6,128,159
[45] Date of Patent: Oct. 3, 2000

[54] DISK DEVICE HAVING VENTILATION STRUCTURE BETWEEN OUTSIDE AND INSIDE

[75] Inventor: Tsuneyori Ino, Kawasaki, Japan

[73] Assignee: Fujitsu Ltd., Kawasaki, Japan

[21] Appl. No.: 09/041,393

[22] Filed: Mar. 12, 1998

[30] Foreign Application Priority Data

May 30, 1997 [JP] Japan .................................. 9-142586

[51] Int. Cl.⁷ .................................................. G11B 33/14
[52] U.S. Cl. .......................................................... 360/97.02
[58] Field of Search ............................. 360/97.01, 97.02, 360/97.03, 98.01

[56] References Cited

U.S. PATENT DOCUMENTS

| | | | |
|---|---|---|---|
| 4,488,193 | 12/1984 | Davis et al. .............................. | 368/98 |
| 4,863,499 | 9/1989 | Osendorf .................................. | 55/316 |
| 5,025,336 | 6/1991 | Morehouse ........................... | 360/97.02 |
| 5,057,951 | 10/1991 | Eckerd ................................... | 360/97.02 |
| 5,124,856 | 6/1992 | Brown et al. ......................... | 360/97.03 |
| 5,214,549 | 5/1993 | Baker et al. ........................... | 360/97.02 |
| 5,282,100 | 1/1994 | Tacklind et al. ..................... | 360/97.02 |
| 5,307,222 | 4/1994 | Dion ..................................... | 360/97.02 |
| 5,417,743 | 5/1995 | Dauber ..................................... | 96/13 |
| 5,455,728 | 10/1995 | Edwards et al. ........................ | 360/105 |
| 5,539,595 | 7/1996 | Beck et al. ............................. | 360/97.01 |
| 5,754,365 | 5/1998 | Beck et al. ............................. | 360/97.02 |
| 5,761,184 | 6/1998 | Dauber et al. ........................... | 369/247 |
| 5,781,373 | 7/1998 | Larson et al. ......................... | 360/97.02 |

FOREIGN PATENT DOCUMENTS

2236889 9/1990 Japan .
864325 3/1996 Japan .

*Primary Examiner*—William J. Klimowicz
*Attorney, Agent, or Firm*—Greer, Burns & Crain, Ltd.

[57] ABSTRACT

A disk device is disclosed in which an air inlet to an air passage for ventilation between inside and outside of the disk device is secured even when the upper or side surface of the housing of the disk device is closed, while at the same time suppressing the noises and vibrations originating from the disk device. A spindle motor for carrying at least a recording disk and an actuator for driving a carriage having a head for accessing the disk are mounted on the base of the housing. A cover is mounted on the base through a gasket thereby to hermetically seal the interior of the disk device. A ventilation structure is formed in the cover. This ventilation structure includes an air passage formed in the neighborhood of an edge of the cover, a filter-accommodating recess formed around the air passage, an air filter arranged in the filter-accommodating recess, an air passage formed through the base outside of the gasket of the disk device, a ventilation groove formed in the upper surface of the cover for securing communication between the filter-accommodating recess and the air passage, and a sealing member for covering the air passage on the upper surface of the cover.

17 Claims, 10 Drawing Sheets

DISK DEVICE HAVING VENTILATION STRUCTURE BETWEEN OUTSIDE AND INSIDE

BACKGROUND OF THE INVENTION

1. Field of the Invention

The present invention relates to a disk device, or more in particular to a disk device which has a high sound-insulation capability for preventing noise generated in the disk device from leaking out and which comprises a ventilation structure for permitting air to flow between the inside and outside of the device in whatever environment the device is used in a computer system.

2. Description of the Related Art

In recent years, disk devices such as a magnetic disk device and an optical disk device have come to be used as storage devices for the computer. These devices are used with the computer in various environments, and therefore, require adjustment of the pressure difference between the inside and outside of the device caused by the change in the ambient temperature or pressure. For this purpose, ventilation holes (also called breathing holes) are usually formed in the cover of the disk device.

In the case where a disk device out of operation is allowed to stand in an ordinary environment, such substances as S or $SO_2$ (as the result of diffusion of the molecules thereof) are liable to intrude into the device by way of the ventilation between the inside and outside of the disk device. Also, dust and corrosive gases which may intrude into the device have a harmful effect on the internal members such as the disks of the disk device.

In view of this, a ventilation structure (also called a breathing structure) has conventionally been proposed to prevent intrusion of harmful gases into the disk device by a gas adsorption filter mounted in the ventilation holes of the disk device.

However, in the conventional disk device, a filter is usually attached to the interior of the cover. In this case, a storage space for the filter must be formed in the reverse side of the cover to avoid contact with the disk or a metal cover is required on the filter to suppress the expansion of the filter. Further, the ventilation holes of the conventional disk device, which are formed in the upper surface of the cover, are often closed and fail to function depending on the structure of the mounting frame of the disk device built in the system.

Furthermore, the noise generated in the device sometimes leaks out in view of the fact that the disks are rotating at high speed and the head accessing the disks is swung and controlled by an actuator in the device in operation.

SUMMARY OF THE INVENTION

The object of the present invention is to provide a disk device having an improved structure having an air flow passage for ventilation between the inside and outside of the device, in which the air passage between the inside and outside of the disk device can be positively secured even in the case where the upper or side surfaces of the disk device are closed while at the same time making it difficult for the noise generated in the device to be transmitted outside.

In order to achieve the above-mentioned object, according to the first to seventh aspects of the present invention described, below, there is provided an improved disk device comprising a spindle motor with at least a recording disk mountable thereon, an actuator for driving a carriage having at least a head for writing information on the disk, a base with the spindle motor and the actuator mounted thereon, and a cover mounted on the uppermost surface of the base through a gasket for hermetically sealing the spindle motor and the actuator, wherein the cover has a ventilation structure for obviating the difference in air pressure between the inside and outside of the disk device.

According to a first aspect of the invention, there is provided a disk device, wherein the ventilation structure includes at least a through hole formed in the neighborhood of an edge of the cover for communication between the inside and outside of the disk device, a filter-accommodating recess formed around the through hole on the upper surface of the cover, an adsorption air filter arranged in the filter-accommodating recess in such a manner as to cover the through hole, an air passage for securing communication from the bottom of the base to the upper surface of the base of the disk device along the exterior of a gasket, a ventilation groove formed in the upper surface of the cover for communication between the filter-accommodating recess and the air passage, and a seal means for closing the filter-accommodating recess, the ventilation groove and the upper opening of the air passage.

According to a second aspect similar to the first aspect of the invention, there is provided a disk device, wherein the seal means is a damper composed of a single solid plate closely attached over the entire upper surface of the cover.

According to a third aspect similar to the second aspect of the invention, there is provided a disk device, wherein the damper of a single solid plate is composed of a stainless steel sheet and a sheet of two-sided tape, which are attached to each other and punched through from the stainless steel sheet side thereof, and wherein at least a film member is inserted between the two-sided tape and the upper surface of the cover for preventing direct contact between the two-side tape and the air filter.

According to a fourth aspect similar to the second or third aspect of the invention, there is provided a disk device, wherein the ventilation structure further comprises a depression formed to a uniform depth in a predetermined area including the filter-accommodating recess on the upper surface of the cover, and a second damper inserted in the depression with the upper surface thereof flush with the upper surface of the cover.

According to a fifth aspect similar to the fourth aspect of the invention, there is provided a disk device, wherein the second damper is composed of a metal, a sponge material or a nonwoven fabric.

According to a sixth aspect similar to the first to fourth aspects of the invention, there is provided a disk device, wherein the ventilation structure further comprises an inner groove formed in the inner surface of the cover and having an end thereof communicating with the through hole, the other end thereof communicating with the internal portion of the disk device having a negative pressure, and a film member for closing the through hole and the portion of the inner groove other than the other end thereof from the inner surface side of the cover.

According to a seventh aspect similar to the third to sixth aspects of the invention, there is provided a disk device, wherein the film member is composed of a metal, a resin deposited with aluminum by evaporation or a resin having a volume resistivity of not more than $10^8$ $\Omega \cdot m$.

In the disk device according to the first aspect, the interior of the disk device communicates with the bottom of the base by way of the through hole formed in the cover, the air filter located in the filter-accommodating recess formed on the upper surface of the cover, the ventilation groove formed between the upper surface of the cover and the seal member and the air passage communicating from the bottom of the base to the upper surface of the cover. Even in the case where the upper surface or the side surface of the disk device is closed, therefore, the ventilation of the disk device is not adversely affected.

In the disk device according to the second aspect, the seal member is a damper composed of a single solid plate, and therefore the sound insulation capability of the disk device is improved.

In the disk device according to the third aspect, the two-side tape and the filter are prevented from coming into direct contact with each other by the film member, and therefore the air filter, even if expanded for some reason, is never attached to the two-side tape.

In the disk device according to the fourth and fifth aspects, the vibration of the magnetic disk is further suppressed by the second damper.

In the disk device according to the sixth aspect, the through hole formed in the cover communicates with the negative-pressure portion in the disk device by way of the inner groove formed in the inner surface of the cover, and therefore the ventilation efficiency is improved.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given of the conventional disk device shown in FIGS. 1 to 2C.

Figure 1:
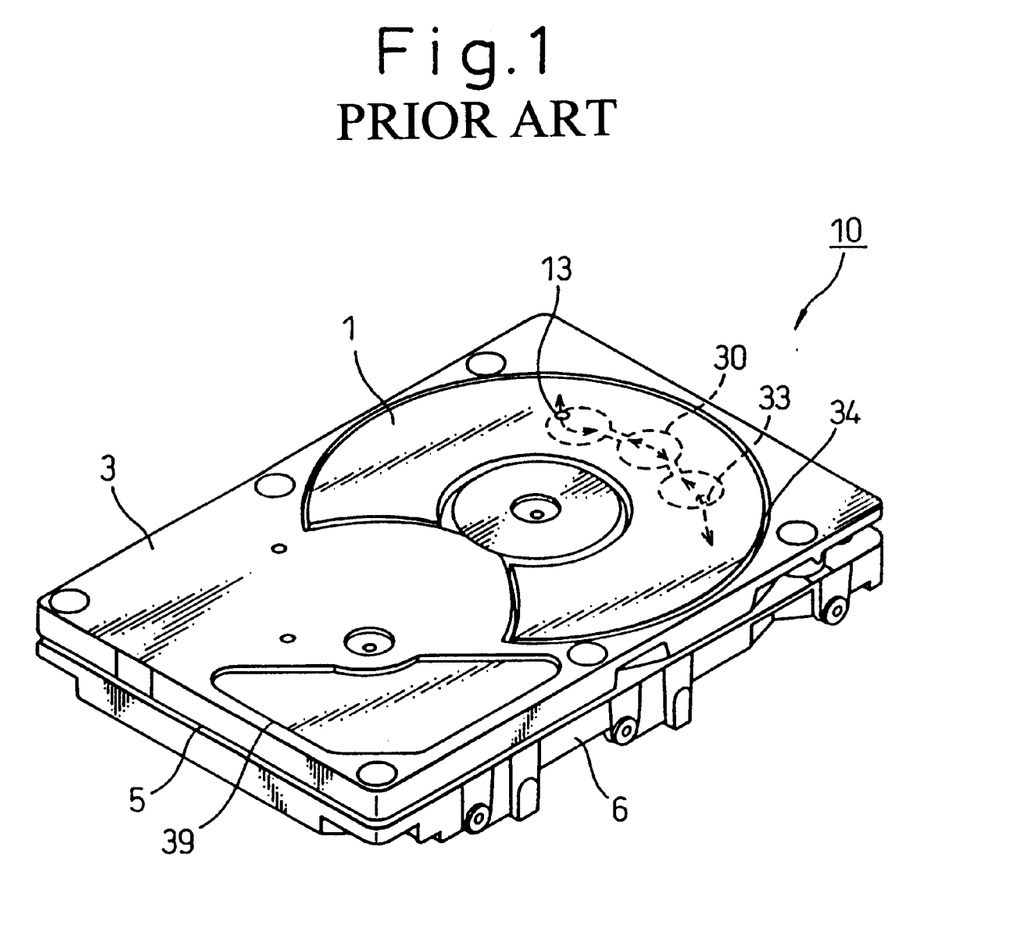
FIG. 1 is a diagram showing a general configuration of a magnetic disk device having a conventional cover structure with an air passage.

FIG. 1 shows a configuration of a magnetic disk device 10 having a cover structure according to the prior art. In FIG. 1, reference numeral 1 designates a damper for suppressing the vibrations and noises generated from the magnetic disk device 10, numeral 3 a cover, and numeral 5 a gasket for sealing the space between a base 6 and the cover 3. The damper 1 is mounted in a depression 34 formed on the cover 3 through a viscoelastic plate. The base 6 has mounted therein a spindle motor for carrying a plurality of recording disks, a carriage for carrying a head for writing information on the recording disks, an actuator for driving the carriage, etc.

A ventilation hole 13 is formed at a predetermined position of the damper 1 on the upper surface of the cover 3 exposed to the atmosphere. An air passage 30, which is hermetically sealed by the damper 1, is formed in the depression 34. The air passage 30 is shaped taking the flow path conductance into account. An end of the air passage 30 is overlapped with the ventilation hole 13 formed in the damper 1, and the other end of the air passage 30 is formed with another ventilation hole 33 communicating with the interior of the magnetic disk device 10. A filter unit described later is arranged under the portion of the cover 3 corresponding to the ventilation hole 33.

Figure 2A:
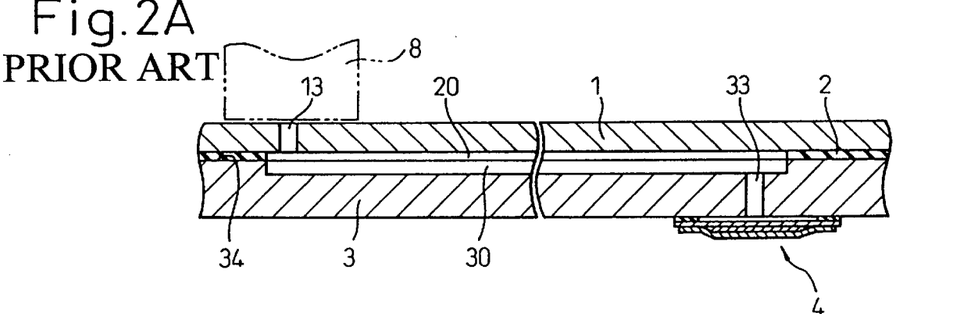
FIG. 2A is an enlarged sectional view for explaining a part of an example of the air passage shown in FIG. 1.

FIG. 2A is an enlarged sectional view showing a part of an example structure of the air passage 30 formed in the cover 3 of FIG. 1. FIG. 2B is an enlarged sectional view showing a part of another example structure of the air passage 30 formed in the cover 3. FIG. 2C shows a configuration of the filter unit 4.

Figure 2B:
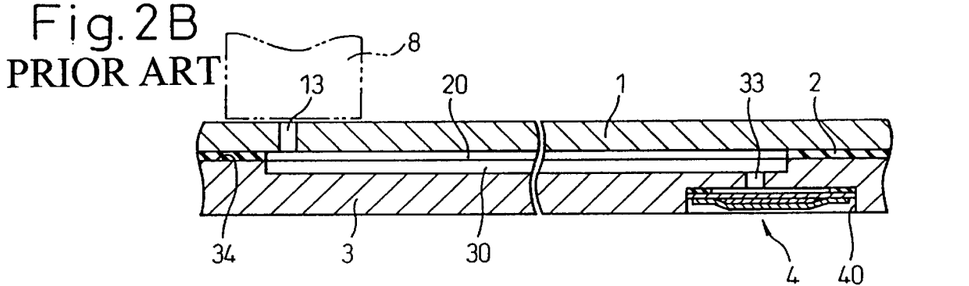
FIG. 2B is an enlarged sectional view for explaining a part of another example of the air passage shown in FIG. 1.

As shown in FIGS. 2A, 2B, an end of the air passage 30 formed in the depression 34 is overlapped with the ventilation hole 13 formed in the damper 1 laid on the same end. The other end of the air passage 30 is overlapped on the ventilation hole 33 formed through the cover 3. Numeral 2 designates the above-mentioned viscoelastic plate, and numeral 20 an aperture formed in the viscoelastic plate 2 in the same shape as the air passage 30. The filter unit 4 is arranged on the inside of the portion of the cover 3 formed with the ventilation hole 33. This filter unit 4, as shown in FIG. 2A, is directly mounted on the inner surface of the cover 3 or, as shown in FIG. 2B, is accommodated in a filter mounting recess 40 formed in the inner surface of the cover 3. According to this embodiment, the filter mounting recess 40 is substantially D-shaped.

Figure 2C:
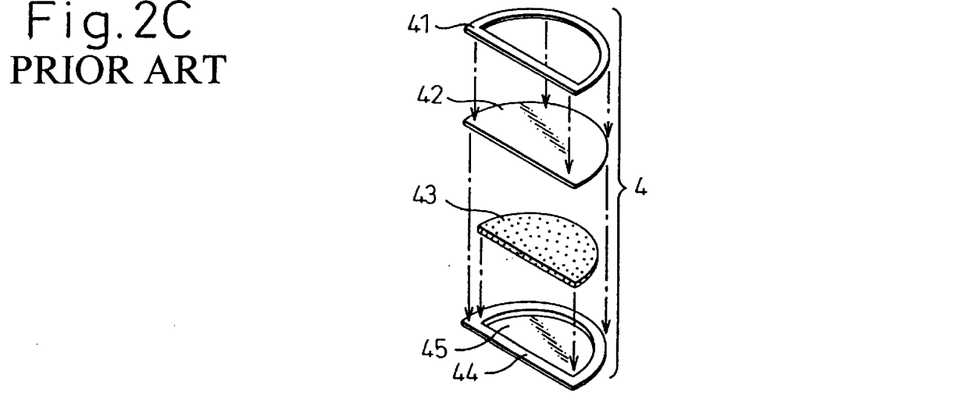
FIG. 2C is a perspective view showing a configuration for assembly of a filter unit in FIGS. 2A and 2B.

FIG. 2C shows a configuration of the filter unit 3 directly mounted on the inner surface of the cover 3 or accommodated in the filter mounting recess 40. The filter unit 4 includes a piece of two-sided tape 41 attached on the inner surface of the cover 3 or on the bottom surface of filter-mounting recess 40, a PET sheet 42, a chemical filter 43 for adsorbing gases and a filter 44 for removing dust. The air entering inside of the cover 3 through the ventilation hole 33 always passes through the filter unit 4. Gases harmful to the disks, which may be contained in the air passing through the unit 4, therefore, are trapped by (adsorbed to) the chemical filter 43 and thus prevented from intruding inside of the cover 3.

In the cover structure of the conventional disk device, however, the fact that the filter unit 4 for the ventilation structure is arranged on the inner surface (reverse side) of the cover 3 makes it necessary to provide some device for avoiding contact with the internal disks. Also, the ventilation hole 13 of the disk device, which is formed on the upper surface of the cover 3, is sometimes undesirably closed by an obstacle 8 such as a mounting frame of the disk device indicated by two-dot chain in FIGS. 2A, 2B depending on the structure of the frame when the disk device is built in a system, with the result that the ventilation hole 13 fails to function properly.

Further, with the cover structure such as for the disk device shown in FIG. 1, the magnetic circuit of the actuator is formed in a large size and a relief hole 39 for the magnetic circuit is formed in the portion of the cover 3 corresponding to the magnetic circuit in order to shorten the access time of the actuator in the disk device. Consequently, the noises generated in the disk device are easily transmitted outside through the relief hole 39, thereby posing the problem of a deteriorated sound-insulation characteristic.

A specific example of a configuration of a disk device according to the invention intended to obviate the above-mentioned problems will be described specifically. The component members of the disk device according to this embodiment identical to those of the conventional disk device 10 shown in FIGS. 1 to 2C are designated by the same reference numerals, respectively.

Figure 3:
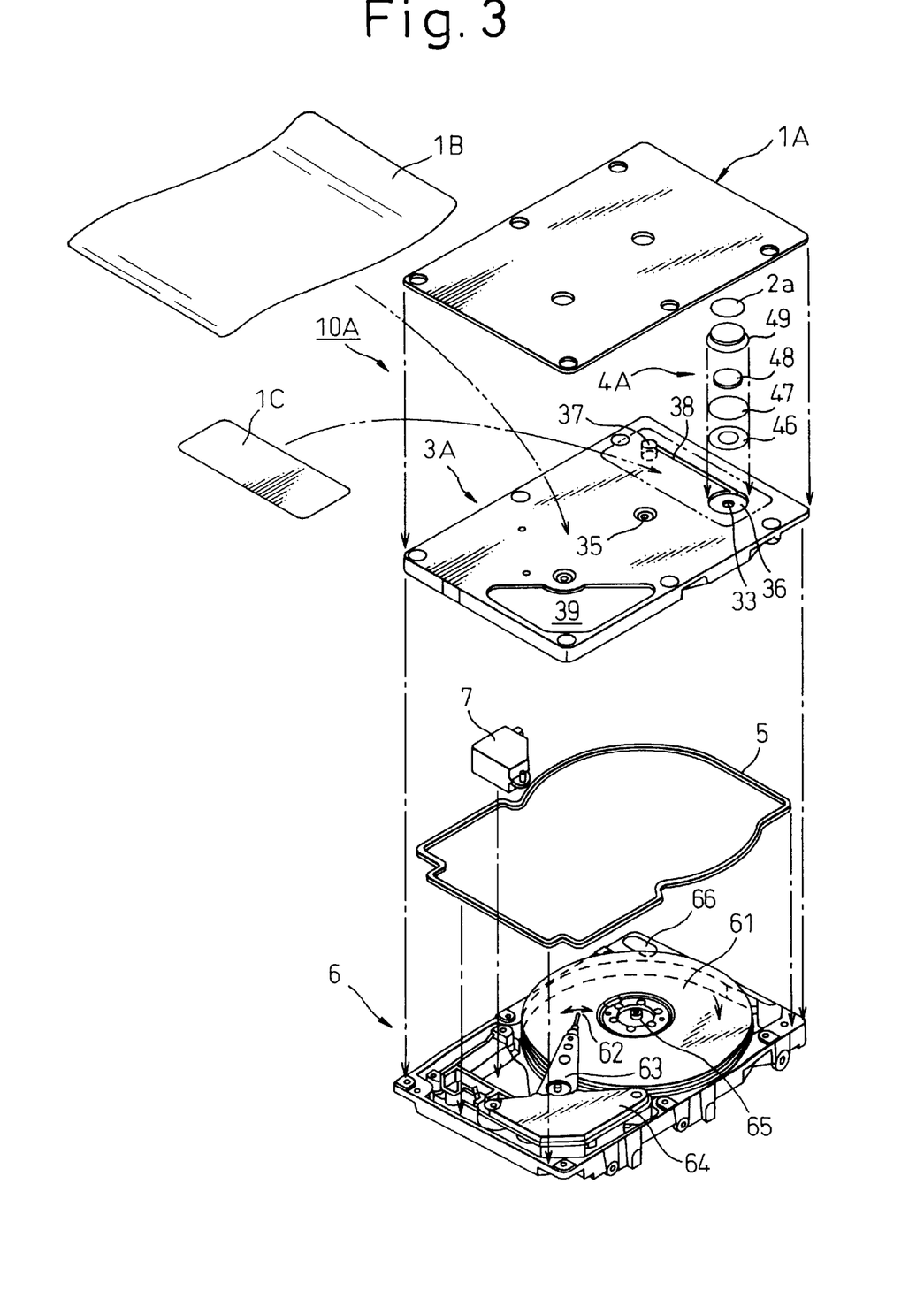
FIG. 3 is a perspective view of a magnetic disk device to be assembled with a ventilation structure according to a first embodiment of the invention.

FIG. 3 is a perspective view of a magnetic disk device 10A to be assembled with a ventilation structure according to a first embodiment of the invention. In FIG. 3, numeral 1A designates a damper made of a single solid plate for suppressing the vibrations and noises generated from the magnetic disk device 10A, numeral 3A a cover, numeral 4A a filter unit, numeral 5 a gasket, numeral 6 a base and numeral 7 a desiccant unit.

The base 6 has mounted thereon a spindle motor 65 for carrying a plurality of recording disks 61, a carriage 63 for carrying as many heads 62 as there are recordable disk surfaces for writing information on the disks 61, an actuator 64 for driving the carriage 63, etc. The parts including the spindle motor 65, the actuator 64, etc. mounted on the base 6 are hermetically sealed by the cover 3A applied on the base 6 through the gasket 5.

The gasket 5 is for hermetically sealing the space between the base 6 and the cover 3A and is made of an elastic material such as rubber. The gasket 5 is arranged on the smallest possible area sufficient to seal the internal space of the base 6 alone, and such portions not belonging to the internal space as the ventilation hole 66 formed through the upper and lower surfaces of the base 6 are arranged outside of the gasket 5.

The upper surface of the cover 3A in contact with the atmosphere according to the first embodiment has a ventilation hole 33 formed in the neighborhood of an edge of the cover 3A and constituting a through hole for communication between the interior and the exterior of the disk device 10A, a circular filter-accommodating recess 36 formed with a uniform depth around the ventilation hole 33, an air passage 37 formed through the cover 3A at a position overlapped with the ventilation hole 66 formed through the upper and lower surfaces of the base 6, and a ventilation groove 38 for assuring communication between the air passage 37 and the filter-accommodating recess 36. Numeral 35 designates a hole for fixing the rotational shaft of the spindle motor 65, and numeral 39 a relief hole for the magnetic circuit of the actuator 64. The relief hole 39 formed in the cover 3A has the upper surface usually covered with a thin tape not shown.

Figure 4A:
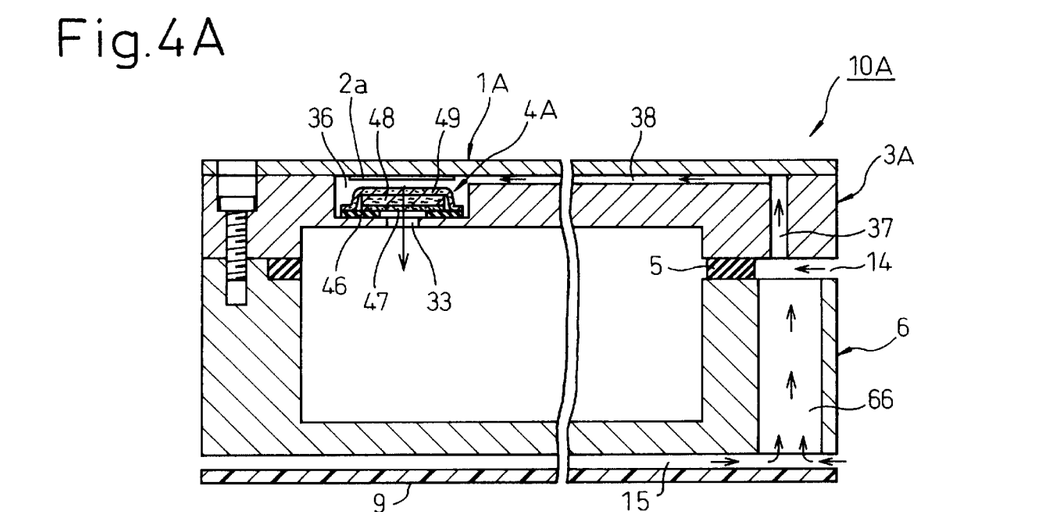
FIG. 4A is a sectional view showing a structure of the air passage formed in the cover of the magnetic disk device of FIG. 1.
Figure 4B:
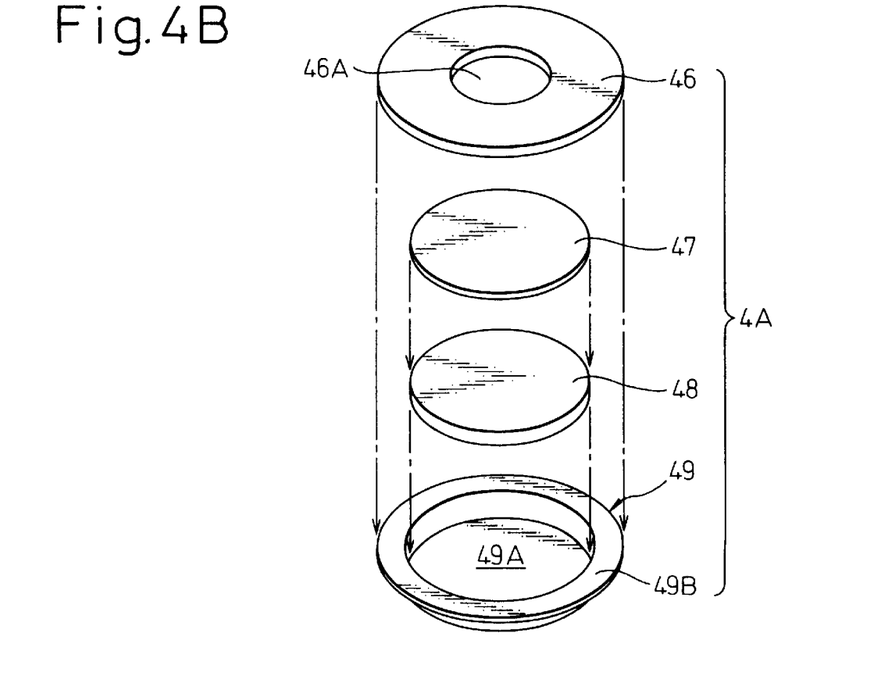
FIG. 4B is a perspective view showing the structure of a filter to be assembled and arranged in the air passage shown in FIG. 4A.

The filter unit 4A accommodated in the filter-accommodating recess 36 includes, as shown in detail in FIG. 4A, a sealing plate 46 having a central hole 46A, a circular dust filter 47 having a larger diameter than the hole 46A, an air filter 48 containing activated carbon of the same size as the dust filter 47 and a hat-shaped dust filter 49. The dust filters 47, 49 can be configured of polytetrafluoroethylene (PTFE), for example. The dust filter 47 and the air filter 48 are overlapped with each other and inserted in a depression 49A of the hat-shaped dust filter 49. The sealing plate 46 is overlapped with a flange 49B of the dust filter 49 and makes up the filter unit 4A. The filter unit 4A, as shown in FIG. 3, is mounted in the filter-accommodating recess 36 in such a manner that the sealing plate 46 is located on the bottom of the filter-accommodating recess 36. Also, a film sheet 2a is inserted above the dust filter 49.

The air entering the base 6 by way of the ventilation hole 33, therefore, always passes through the filter unit 4A. The dust contained in the air passing through the filter unit 4A is removed by the dust filters 47, 49. Also, gases harmful to the disks are trapped by (adsorbed to) the air filter 48, and thus cannot intrude into the magnetic disk device 10A.

The damper 1A formed of a single solid plate having substantially the same area as the cover 3A is made of a metal such as stainless steel at approximately 0.2 mm thick or less. The damper 1A is adhered over the entire upper surface of the cover 3A by a two-sided tape or the like having the same shape as the damper 1A and 0.05 mm thick or less. The two-sided tape, after being attached to the stainless steel sheet, is integrally punched by press work from the stainless steel side. This makes possible simultaneous punching work for lower fabrication costs. The above-mentioned film sheet 2a is for preventing the dust filter 49 from becoming attached to the two-sided tape in the case where the filter unit 4A expands for some reason.

Apart from the above-mentioned embodiment in which the damper 1A formed of a single solid plate is mounted on the cover 3A, a thin sealing member 1B can alternatively be attached over the entire surface of the cover 3A in place of the damper 1A. Also, a small sealing member 1C sufficient to cover the filter-accommodating recess 36, the ventilation recess 38 and the upper surface of the air passage 37 alone on the cover 3A can be attached on a small area defined by a two-dot chain line.

FIG. 4A shows a configuration of the air passage formed in the cover 3A of the magnetic disk device 10A of FIG. 3. As described above, the filter-accommodating recess 36, the ventilation recess 38 and the upper side of the air passage 37 formed on the upper surface of the cover 3A are sealed by the damper 1A attached on the upper surface of the cover 3A through the two-side tape. A filter sheet 2a for preventing the dust filter 49 of the filter unit 4A from attaching to the two-sided tape is applied on the surface of the damper 1A opposed to the filter-accommodating recess 36. Also, a ventilation hole 66 is formed through the upper and lower surfaces of the base 6 under the air passage 37. Further, a printed board 9 with circuit parts mounted thereon for controlling the magnetic disk device 10A is generally arranged on the bottom surface of the base 6.

In the magnetic disk device 10A according to the first embodiment configured as described above, the internal space of the magnetic disk device 10A communicates with a first gap 14 between the cover 3A and the base 6 through the filter unit 4A, the filter-accommodating recess 36, the ventilation recess 38 and the air passage 37, or with a second gap 15 between the bottom surface of the base 6 and the printed board 9 through the ventilation hole 66 formed in the base 6. As a result, air is introduced into the magnetic disk device 10A from the gap 14 or 15 as indicated by arrows. Even in the case where the upper surface or the side surface of the magnetic disk device 10A is sealed, therefore, at least the air on the bottom surface of the base 6 is introduced into the magnetic disk device 10A, thereby keeping the magnetic disk device 10 in a ventilated state.

Also, the filter unit 4A, which is arranged on the upper surface of the cover 3A, is never protruded into the magnetic disk device 10A nor interferes with the magnetic disks. Further, since the damper 1A made of a single solid plate is closely attached over the entire upper surface of the cover 3A, the relief hole 39 formed in the cover 3A is covered by the damper 1A to thereby shut off the internal noises of the disk device for an improved sound-insulation capability of the disk device.

Figure 5:
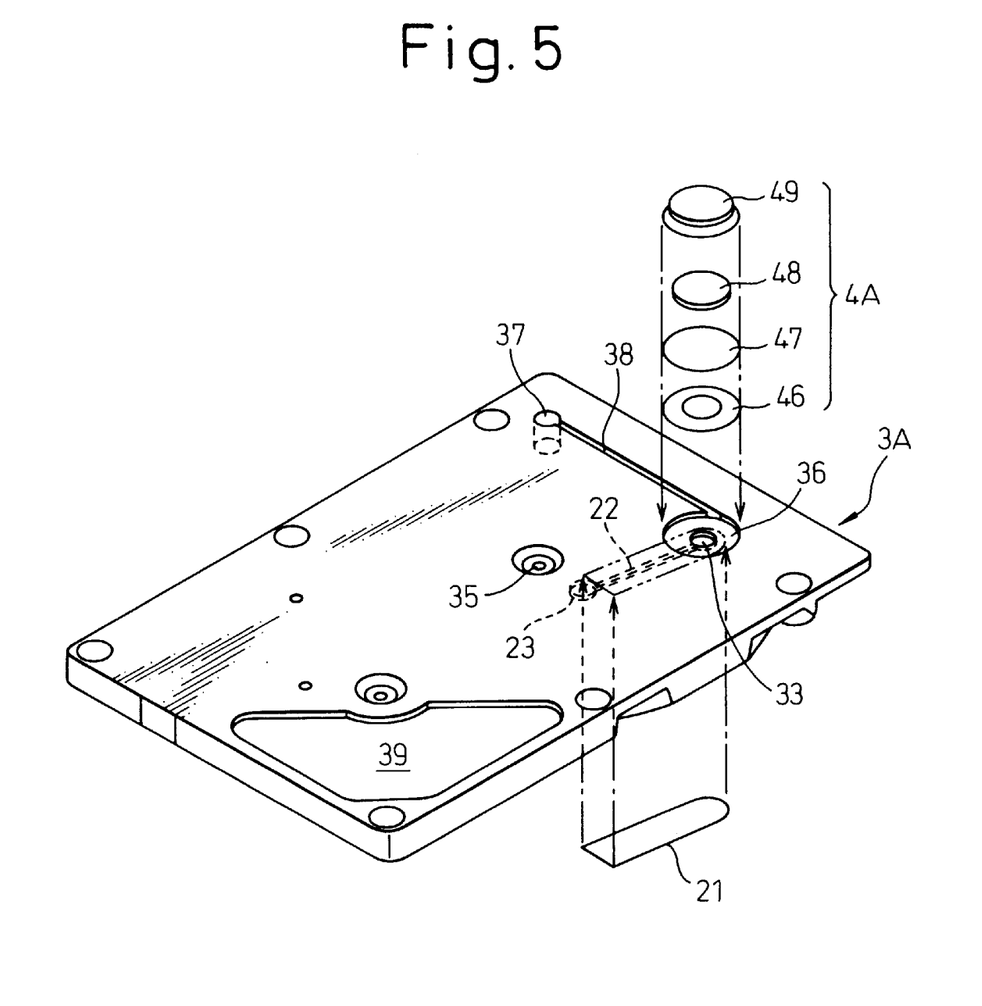
FIG. 5 is a perspective view showing a cover for the ventilation structure according to a modification of the first embodiment of the invention.

FIG. 5 is a perspective view showing the cover 3A to be assembled as a modification of the ventilation structure according to the first embodiment described with reference to FIGS. 3 to 4C. The internal pressure of the magnetic disk device 10A in operation is not uniform due to the rotation of the disks. Specifically, the pressure on the outer periphery of the disks is high, while the pressure on the inner periphery of the disks (in the neighborhood of the rotational center of the spindle) assumes a negative value. This indicates that a ventilation hole, if formed in the inner periphery of the disks, causes a negative pressure and facilitates the introduction of the atmospheric air.

In view of this, according to the embodiment shown in FIG. 5, an air inlet 23 is formed in the inner surface of the cover 3A in the vicinity of the hole 35 for fixing the rotational shaft of the spindle according to the first embodiment. This air inlet 23 communicates with the ventilation hole 33 by way of an air introduction recess 22 formed in the inner surface of the cover 3A. The portions of the ventilation hole 33 and the air introduction recess 22 on the inner surface of the magnetic disk device 10A are sealed by a film-like seal 21 attached on the inner surface of the cover 3A. Consequently, the air introduced to the ventilation hole 33 as described above subsequently passes through the air introduction recess 22 into the magnetic disk device 10A by way of the air inlet 23.

As described above, the last inlet for introducing the atmospheric air into the magnetic disk device 10A is located in the neighborhood of the rotational shaft of the spindle. The atmospheric air can thus be easily introduced into the magnetic disk device 10A.

Figure 6:
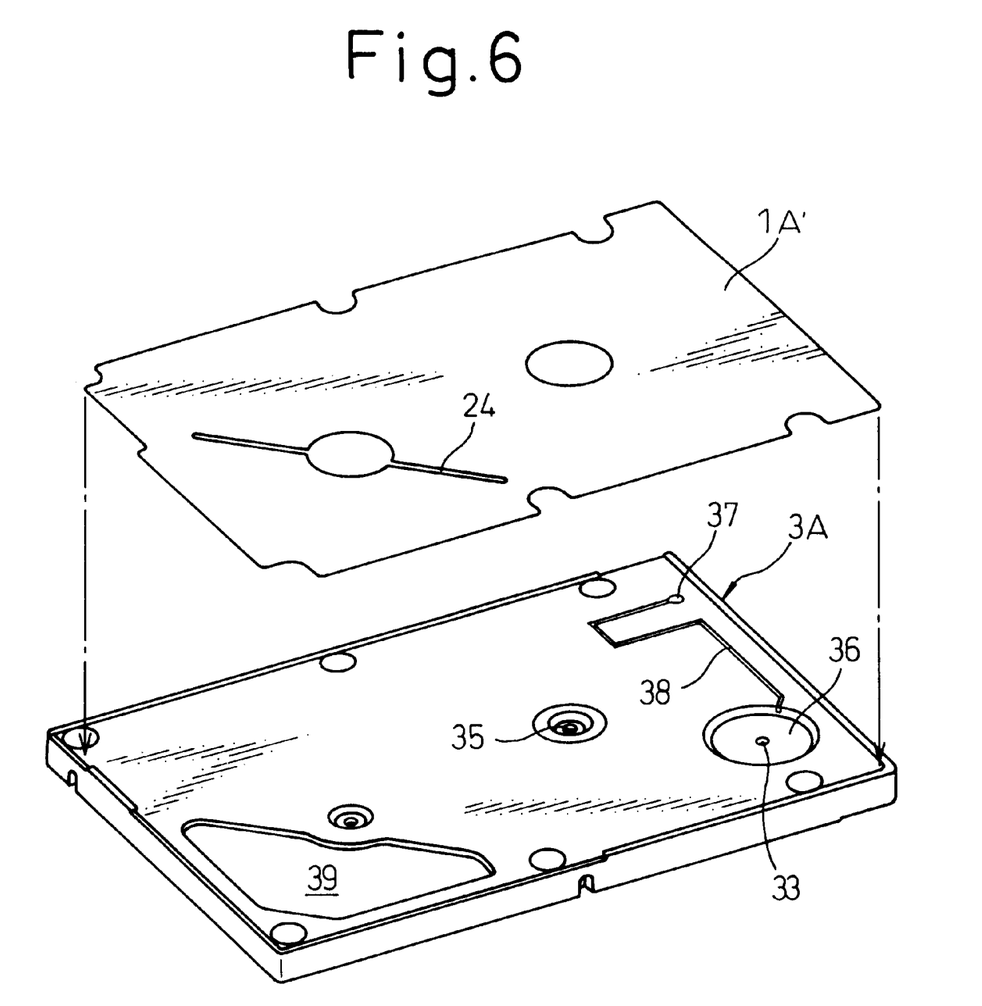
FIG. 6 is a perspective view showing a cover and a damper for the ventilation structure according to another modification of the first embodiment of the invention.

FIG. 6 shows another modification of the ventilation structure according to the first embodiment of the invention described with reference to FIGS. 3 to 4C. This modification is different from the first embodiment only with respect to the damper 1A', and is otherwise identical to the first embodiment in the other points. Thus, a film sheet 2a, though not shown, is attached on the lower surface of the damper 1A' in opposed relation to the filter-accommodating recess 36. The relief hole 39 formed in the cover 3A has the upper surface thereof covered with a thin tape not shown. The damper 1A', which is formed to be thinner than damper 1A, has a slit 24 diagonally formed for accommodating the step with the tape.

The advantage of thinning the damper 1A' of stainless steel is that the reduction in rigidity of the cover 3A can be minimized and that lower burrs are produced in the metal plate when the damper 1A' is punched integrally. Also, in the case where the height of the cover 3A is limited, the cover 3A is unavoidably thinned if the damper 1A of stainless steel is thick, resulting in a decreased rigidity for supporting the rotational shaft of the spindle motor or the actuator. In such a case, therefore, the use of the damper 1A' of stainless steel is effective.

Figure 7:
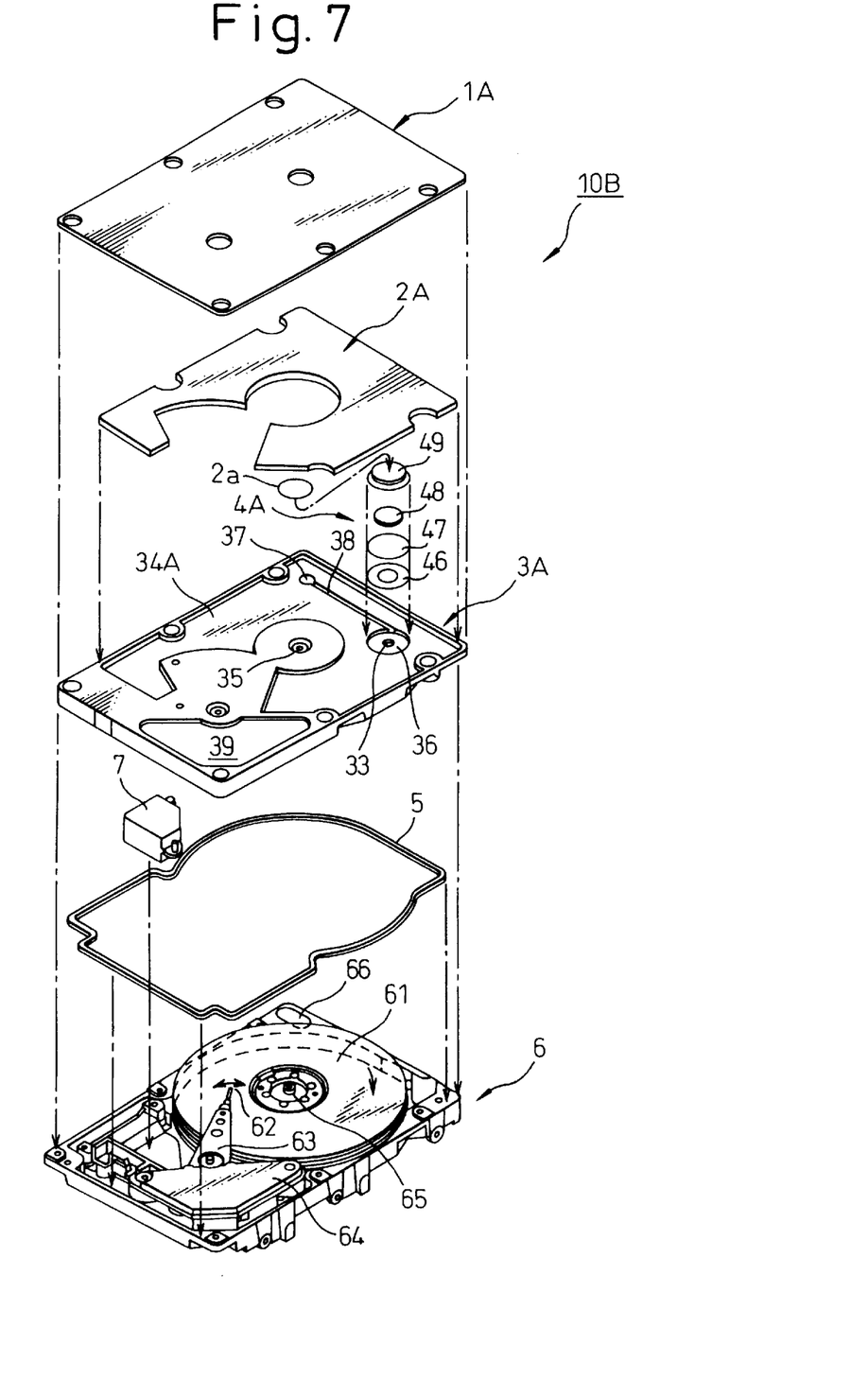
FIG. 7 is a perspective view of a magnetic disk device to be assembled with the ventilation structure according to a second embodiment of the invention.

FIG. 7 is a perspective view of a magnetic disk device 10B to be assembled with a ventilation structure according to the second embodiment of the invention. In FIG. 7, numeral 1A designates a damper made of a single solid plate (first damper) for suppressing the vibrations and noises generated from the magnetic disk device 10B, numeral 2A a second damper, numeral 3A a cover, numeral 4A a filter unit, numeral 5 a gasket, numeral 6 a base, and numeral 7 a desiccant unit.

The first damper 1A, the film sheet 2a, the film unit 4A, the gasket 5, the base 6 and the desiccant unit 7 have exactly the same configuration as the corresponding component parts of the first embodiment and therefore will not be described any further.

According to the second embodiment, the comparatively thick upper surface portion of the cover 3A in contact with the atmosphere is depressed to a predetermined depth of, say, about 0.6 mm thereby to form a depression 34A. This depression 34A has formed therein, as in the first embodiment, a ventilation hole 33 making up a through hole for assuring communication between inside and outside of the disk device 10B, a circular filter-accommodating recess 36 of uniform depth formed around the ventilation hole 33, an air passage 37 formed through the cover 3A at a position overlapped with the ventilation hole 66 formed through the upper and lower surfaces of the base 6, and a ventilation groove 38 for establishing communication between the air passage 37 and the filter-accommodating recess 36. Numeral 35 designates a hole for fixing the rotational shaft of the spindle motor 65, and numeral 39 a relief hole for the magnetic circuit of the actuator 64, which hole has the upper surface thereof normally covered with a thin tape not shown.

The second damper 2A has the same shape and the same height as the depression 34A formed on the cover 3A. The second damper 2A, when placed in the depression 34A, is substantially flush with the upper end surface of the cover 3A. The film sheet 2a is attached to the surface of the second damper 2A opposed to the filter-accommodating recess 36.

Now, an explanation will be given of the reason why the depression 34A is formed in the upper surface of the cover 3A and the second damper 2A is inserted between the first damper 1A and the cover 3A.

The vibrations which may occur in the magnetic disk device 10B are transmitted to the cover 3A and produce a sound. In the case where the first damper 1A is attached to the cover 3A closely as in the first embodiment, therefore, it is possible also for the first damper 1A to vibrate and produce a sound. A structure is necessary, therefore, which makes it difficult for the vibration of the cover 3A to be transmitted to the first damper 1A. The depression 34A on the cover 34A, which is provided for meeting this requirement, is formed by thinning the comparatively thick portion thereof. The depression 34A forms a space between the cover 3A and the first damper 1A, thereby making it difficult for the vibration of the cover 3A to be transmitted to the first damper 1A.

Consequently, the second damper 2A placed in the depression 34A can be formed of such a sound-attenuating material as sponge or nonwoven fabric which absorbs the sound originating from the cover 3A. The second damper 2A can alternatively be made of such a metal damping material as lead having a large specific gravity capable of reducing the vibrations of the cover 3A. In this way, outward propagation of internal vibrations of the magnetic disk device 10B can be suppressed by mounting the second damper 2A in the depression 34A of the cover 3A. The reliability and the noise insulation effect of the cover 3A are thus further improved.

Figure 8:
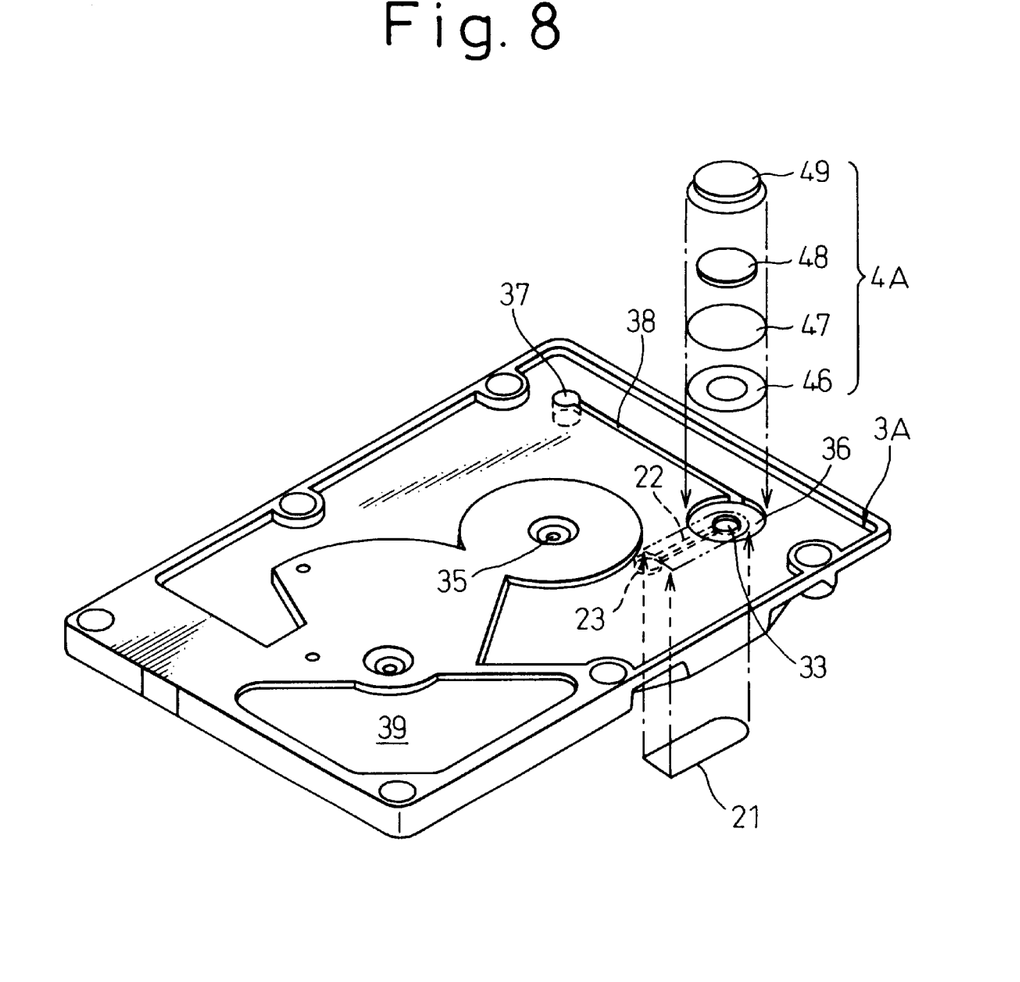
FIG. 8 is a perspective view of a cover to be assembled for the ventilation structure according to a modification of the second embodiment of the invention shown in FIG. 7.

FIG. 8 is a perspective view of the cover 3A to be assembled with the ventilation structure according to a modification of the second embodiment. This modification is similar to the first embodiment explained with reference to FIG. 5. Specifically, according to this modification, an air inlet 23 is formed in the inner surface of the cover 3A in the neighborhood of the hole 35 for fixing the rotational axis of the spindle. This air inlet 23 communicates with the ventilation hole 33 by way of the air introduction groove 22 formed in the inner surface of the cover 3A. The surfaces of the ventilation hole 33 and the air introduction groove 22 on the inside of the magnetic disk device 10B are closed with a film-like seal 21 attached on the inner surface of the cover 3A. Thus, the air introduced into the ventilation hole 33 as described above subsequently passes through the air introduction groove 22 and enters the magnetic disk drive 10B by way of the air inlet 23.

Also in this modification, the introduction of the atmospheric air into the magnetic disk device 10B is facilitated by locating the last atmospheric air inlet to the magnetic disk device 10B in the neighborhood of the rotational shaft of the spindle.

Figure 9:
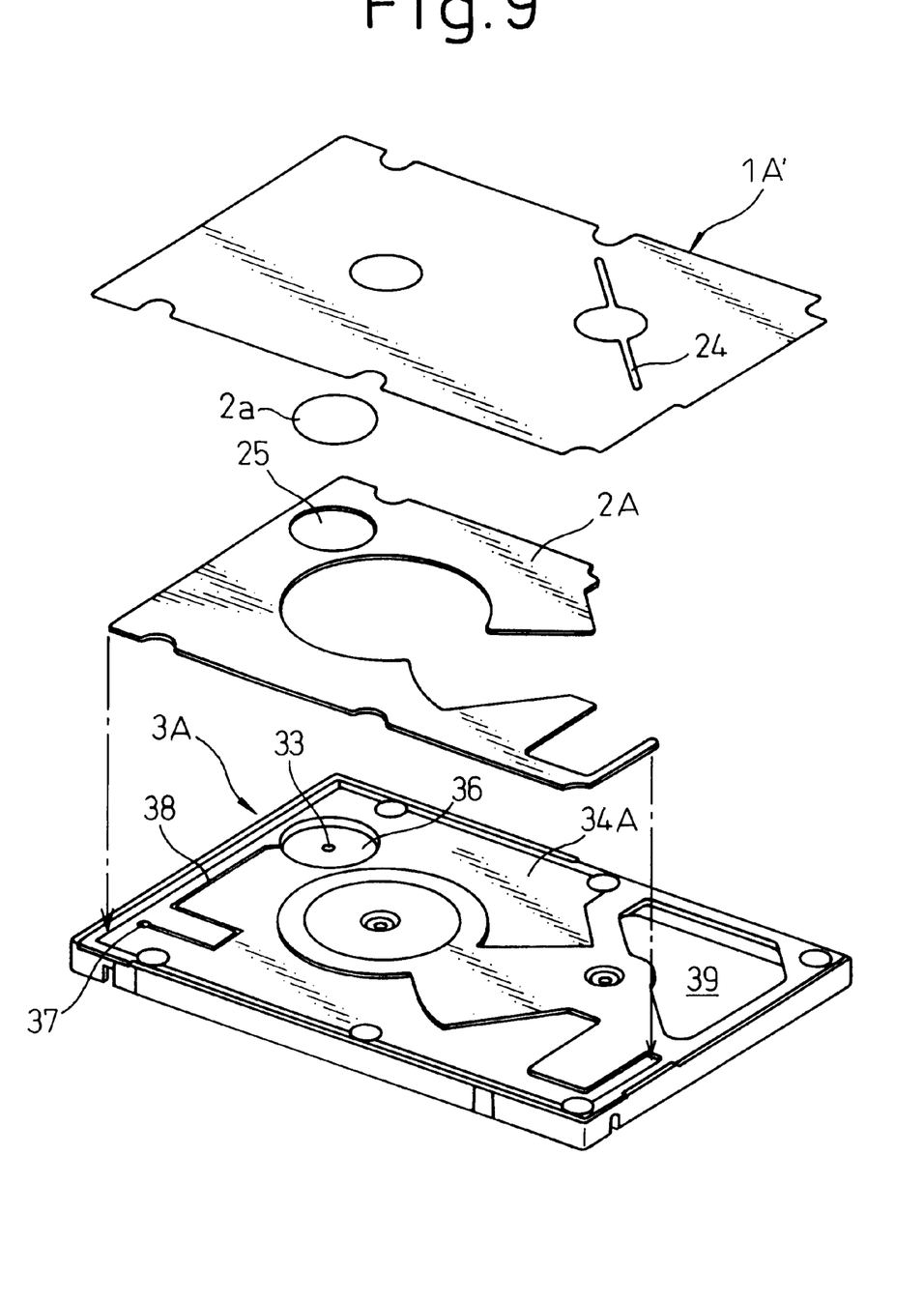
FIG. 9 is a perspective view of a cover to be assembled for the ventilation structure according to another modification of the second embodiment of the invention shown in FIG. 7.

FIG. 9 shows a ventilation structure according to another modification of the second embodiment of the invention. This modification corresponds to the modification of the first embodiment shown in FIG. 6. This second modification of the second embodiment is different from the second embodiment only in that the damper 1A' is formed thinner and in that a circular hole 25 having the same diameter as the filter-accommodating recess 36 is formed at a position opposed to the filter-accommodating recess 36 of the second damper 2A. The remaining parts are identical to the corresponding parts of the first modification of the second embodiment. The circular hole 25 is formed for securing a space that can accommodate the expansion, if any, of the filter unit 4A for some reason. In this modification, too, the film sheet 2a is attached to the lower surface portion of the damper 1A' opposed to the filter-accommodating recess 36 in order to keep the filter unit 4A out of contact with the two-sided tape attached on the lower surface of the damper 1A'. The upper surface of the relief hole 39 formed in the cover 3A is covered with a thin tape not shown. A diagonal slit 24 formed in the damper 1A' is for accommodating the difference in height with the tape.

The advantage of thinning the damper 1A' of stainless steel is that the rigidity reduction of the cover 3A is minimized, so that fewer burrs are formed on the metal plate when punching the damper 1A' integrally. Also, in the case where the cover 3A has a limit of height, a large thickness of the damper 1A of stainless steel would make it impossible to reduce the thickness of the cover 3A, resulting in a reduced rigidity for supporting the rotational shafts of the actuator and the spindle motor built in the disk device. In such a case, therefore, the use of the damper 1A' of a thin stainless steel plate is advantageous.

The film sheet 2a can be made of a material capable of suppressing the generation of static electricity such as a metal, a resin deposited with aluminum by evaporation or a resin having a volume resistivity of not more than $10^8$ $\Omega \cdot m$. In such a case, the effect of static electricity on the MR head can be minimized.

Figure 10:
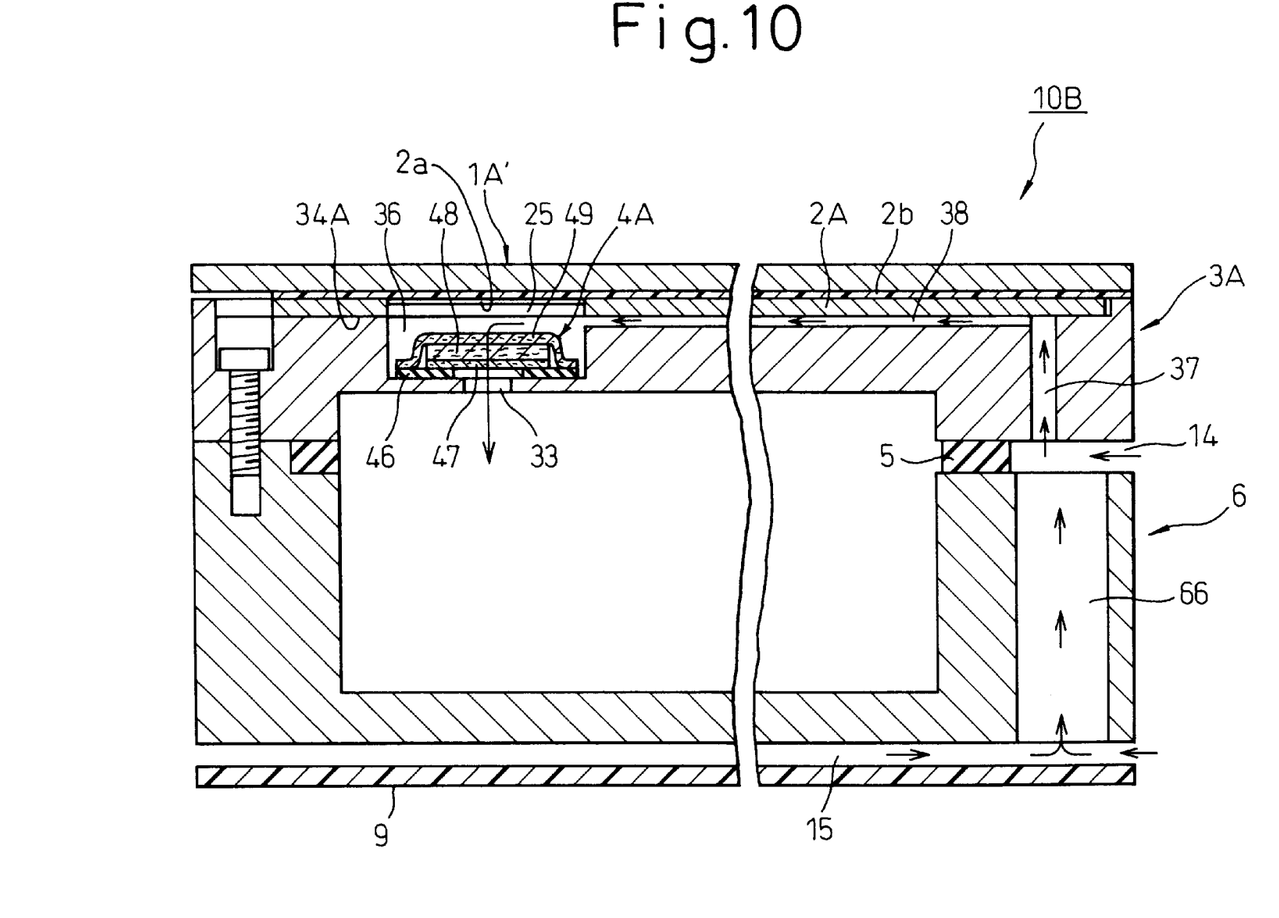
FIG. 10 is a sectional view showing the air passage of a magnetic disk device configured with the ventilation structure of FIG. 9.

FIG. 10 shows a structure of the ventilation passage in the magnetic disk device 10B using the cover 3A of FIG. 9. According to another modification of the second embodiment, a circular hole 25 is formed at that portion of the second damper 2A mounted in the depression 34A of the cover 3A which is opposed to the filter-accommodating recess 36. As a result, the ventilation groove 38 formed on the depression 34A and the upper portion of the air passage 37 are sealed by the second damper 2A. Also, the upper portion of the filter-accommodating recess 36 is sealed by the film sheet 2a. In this diagram, numeral 2b designates a two-sided tape for fixing the first damper 1A' on the upper surface of the cover 3A. This embodiment is identical to the second embodiment in that a ventilation hole 66 formed through the upper and lower surfaces of the base 6 is located under the air passage 37 and in that a printed board 9 having mounted thereon the circuit parts for controlling the magnetic disk device 10B is arranged on the bottom of the base 6.

The magnetic disk device 10B according to the second embodiment described with reference to FIG. 7 has a configuration identical to that of the second modification of the second embodiment except that in the magnetic device shown in FIG. 7, the circular hole 25 is not formed at the portion of the second damper 2A corresponding to the filter-accommodating recess 36 as in FIG. 10, and in that the first damper 1A is formed thicker than the first damper 1A'. The basic configuration of the ventilation passage of the magnetic disk device 10B is the same for both embodiments.

Also with the magnetic disk device 10B according to the second embodiment configured as described above, the internal space of the magnetic disk device 10B communicates with a first gap 14 between the cover 3A and the base 6 through the filter unit 4A, the filter-accommodating recess 36, the ventilation groove 38 and the air passage 37 or with a second gap 15 between the bottom of the base 6 and the printed board 9 through the ventilation hole 66 formed in the base 6. As a result, air is also introduced into the magnetic disk device 10B from the gap 14 or the gap 15 as indicated by arrows. Even in the case where the upper surface or the side of the magnetic disk device 10B is sealed, therefore, air is introduced at least from the bottom surface of the base 6 into the magnetic disk device 10B, thereby making it possible to keep the interior of the magnetic disk device 10B always ventilated.

In the magnetic disk device 10B according to the second embodiment comprising the second damper 2A in the depression 34A of the cover 3A in addition to the first damper 1A, the sound insulation effect is further improved over the magnetic disk device 10A of the first embodiment.

The present invention is applicable also to a disk device (such as described in JP-A-9-114851) having the cover in the form of "drop lid" over the base.

The sound insulation of the disk device can be further improved if a damper is attached to the side and the bottom of the base of the disk device.

Although the above-mentioned embodiments concern a magnetic disk device as an example, the disk device according to the present invention is applicable with equal effect to other disk devices such as an optical disk device.

It will thus be understood from the foregoing description that according to the present invention, the inlet for introducing air from outside of the disk device to be used for ventilation between the inside and outside of the disk device does not protrude from the upper surface of the cover but formed at least in the bottom of disk device. Even in the case where the upper or side surface of the disk device is covered when the disk device is built in the system, therefore, the ventilation passage can be secured between the inside and outside of the disk device, thus improving the reliability of the disk device.

Also, the arrangement of a damper made of a single solid plate on the upper surface of the cover of the disk device can suppress the outward propagation of the noises and vibrations generated in the disk device.

What is claimed is:

1. A disk device comprising a base, at least one recording disk, and at least one head for writing information into said disk, and said base being hermetically sealed by a cover mounted on the upper end surface of said base through a gasket, said cover having a ventilation structure for eliminating the pressure difference between inside and outside of said disk device, wherein said ventilation structure comprises:

a through hole formed in said cover for communicating between the inside and the outside of said disk device;

a filter-accommodating recess formed around said through hole;

an adsorptive air filter arranged in such a position as to cover said through hole within said filter-accommodating recess;

air passages for securing communication between the bottom surface of said base and the upper surface of said cover along the exterior of said gasket of said disk device;

a ventilation groove formed in the upper surface of said cover for securing communication between said filter-accommodating recess and said air passage; and sealing means for closing the opening in the upper surfaces of said air filter-accommodating recess, said ventilation groove and said air passage.

2. The disk device according to claim 1, wherein said sealing means is a damper made of a single solid plate closely attached over the entire upper surface of said cover.

3. The disk device according to claim 2, wherein said damper of a single solid plate is configured of a stainless steel sheet and a two-sided tape attached to each other and punched through integrally from the stainless steel sheet side thereof, and wherein film members for preventing direct contact between said two-sided tape and said cover are interposed between said two-sided tape and the upper surface of said cover.

4. The disk device according to claim 3, wherein said ventilation structure further comprises:

a depression formed to a uniform depth in a predetermined area including said filter-accommodating recess on the upper surface of said cover; and a second damper inserted in said depression such a manner as to align the upper surface thereof to be substantially flush with the upper surface of said cover.

5. The disk device according to claim 4, wherein said second damper is composed of a selected one of a metal, a sponge material and a non-woven fabric.

6. The disk device according to claim 5, wherein said ventilation structure further comprises:

an inner groove formed in the inner surface of said cover and having an end thereof communicating with said through hole and the other end thereof communicating with an internal negative-pressure portion of said disk device; and a film member for closing the portion of said inner groove excluding said other end and said through hole from the inner surface of said cover.

7. The disk device according to claim 6, wherein said film member is configured of a selected one of a metal, a resin deposited with aluminum by evaporation and a resin having a volume resistivity of not more than $10^8$ Ω·m.

8. The disk device according to claim 5, wherein said film member is configured of a selected one of a metal, a resin deposited with aluminum by evaporation and a resin having a volume resistivity of not more than $10^8$ Ω·m.

9. The disk device according to claim 4, wherein said ventilation structure further comprises:

an inner groove formed in the inner surface of said cover and having an end thereof communicating with said through hole and the other end thereof communicating with said an internal negative-pressure portion of said disk device; and a film member for closing the portion of said inner groove excluding said other end and said through hole from the inner surface of said cover.

10. The disk device according to claim 4, wherein said film member is configured of a selected one of a metal, a resin deposited with aluminum by evaporation and a resin having a volume resistivity of not more than $10^8$ Ω·m.

11. The disk device according to claim 3, wherein said ventilation structure further comprises:

an inner groove formed in the inner surface of said cover and having an end thereof communicating with said through hole and the other end thereof communicating with an internal negative-pressure portion of said disk device; and a film member for closing the portion of said inner groove excluding said other end and said through hole from the inner surface of said cover.

12. The disk device according to claim 3, wherein said film member is configured of a selected one of a metal, a resin deposited with aluminum by evaporation and a resin having a volume resistivity of not more then $10^8$ Ω·m.

13. The disk device according to claim 2, wherein said ventilation structure further comprises;

a depression formed to a uniform depth in a predetermined area including said filter-accommodating recess on the upper surface of said cover; and a second damper inserted in said depression in such a manner as to align the upper surface thereof to be substantially flush with the upper surface of said cover.

14. The disk device according to claim 13, wherein said second damper is composed of a selected one of a metal, a sponge material and a non-woven fabric.

15. The disk device according to claim 2, wherein said ventilation structure further comprises;

an inner groove formed in the inner surface of said cover and having an end thereof communicating with said through hole and the other end thereof communicating with an internal negative-pressure portion of said disk device; and a film member for closing the portion of said inner groove excluding said other end and said through hole from the inner surface of said cover.

16. The disk device according to claim 1, wherein said ventilation structure further comprises:

an inner groove formed in the inner surface of said cover and having an end thereof communicating with said through hole and the other end thereof communicating with an internal negative-pressure portion of said disk device; and a film member for closing the portion of said inner groove excluding said other end and said through hole from the inner surface of said cover.

17. The disk device according to claim 1, wherein said through hole is located on an upper surface of said cover near an edge thereof.

* * * * *